(12) United States Patent
Unami (10) Patent No.: US 11,330,340 B2
(45) Date of Patent: May 10, 2022

(54) INFORMATION PROCESSING APPARATUS, INFORMATION PROCESSING METHOD, AND INFORMATION PROCESSING PROGRAM

(71) Applicant: Lambda Systems Inc., Tokyo (JP)

(72) Inventor: Shinji Unami, Tokyo (JP)

(73) Assignee: Lambda Systems Inc., Tokyo (JP)

( * ) Notice: Subject to any disclaimer, the term of this patent is extended or adjusted under 35 U.S.C. 154(b) by 0 days.

(21) Appl. No.: 17/178,596

(22) Filed: Feb. 18, 2021

(65) Prior Publication Data

US 2021/0176534 A1 Jun. 10, 2021

Related U.S. Application Data

(63) Continuation of application No. PCT/JP2020/001780, filed on Jan. 20, 2020.

(30) Foreign Application Priority Data

Feb. 25, 2019 (JP) .............................. JP2019-032115

(51) Int. Cl.
*G06F 3/00* (2006.01)
*G06F 13/00* (2006.01)
(Continued)

(52) U.S. Cl.
CPC ..... *H04N 21/4886* (2013.01); *H04N 21/4753* (2013.01); *H04N 21/4856* (2013.01); *H04N 21/4858* (2013.01); *H04N 21/4882* (2013.01)

(58) Field of Classification Search
CPC .......... H04N 21/4886; H04N 21/4753; H04N 21/4856; H04N 21/4858; H04N 21/4882
See application file for complete search history.

(56) References Cited

U.S. PATENT DOCUMENTS

2004/0078814 A1* 4/2004 Allen ................. H04N 21/4316
725/47
2006/0242595 A1* 10/2006 Kizumi .................... G09G 5/34
715/786
(Continued)

FOREIGN PATENT DOCUMENTS

JP 10-021029 A 1/1998
JP 2005-109566 A 4/2005
(Continued)

OTHER PUBLICATIONS

International Search Report dated Mar. 17, 2020 from counterpart International Application No. PCT/JP2020/001780.
(Continued)

*Primary Examiner* — Kyu Chae
(74) *Attorney, Agent, or Firm* — DLA Piper LLP (US)

(57) ABSTRACT

An information processing apparatus includes: a storage that stores templates defining a display form of a ticker; a selection unit that selects a template stored in the storage; a material data acquisition unit that acquires material data to be displayed on the ticker; a production unit that produces ticker data by applying the template selected by the selection unit to the material data acquired by the material data acquisition unit; and a provision unit that provides provision data including the ticker data produced by the production unit.

7 Claims, 6 Drawing Sheets

(51) Int. Cl.
    *H04N 5/445*     (2011.01)
    *H04N 21/488*     (2011.01)
    *H04N 21/475*     (2011.01)
    *H04N 21/485*     (2011.01)

(56) References Cited

U.S. PATENT DOCUMENTS

2008/0263467 A1* 10/2008 Wilkins ................ G06F 40/12
    715/765
2010/0333154 A1* 12/2010 Dasher ............... H04N 21/4622
    725/98

FOREIGN PATENT DOCUMENTS

| JP | 2008-140090 A | 6/2008 |
| JP | 2009-118295 A | 5/2009 |
| JP | 2013-232813 A | 11/2013 |

OTHER PUBLICATIONS

The Office Action dated Nov. 24, 2021, of counterpart Taiwanese Patent Application No. 109104987, along with an English translation.

\* cited by examiner

INFORMATION PROCESSING APPARATUS, INFORMATION PROCESSING METHOD, AND INFORMATION PROCESSING PROGRAM

TECHNICAL FIELD

This disclosure relates to an information processing apparatus, an information processing method, and an information processing program.

BACKGROUND

A technique for generating ticker data by specifying a method of displaying the ticker data has been known conventionally. For example, Japanese Laid-Open Patent Publication No. 10-021029 discloses a technique that stores a plurality of ticker candidate data as help information for a target operation, displays the plurality of candidate data, selects the candidate data, specifies parameters that indicate at least the display direction and display speed when synthesizing the selected candidate data, gives synthesis instructions, and synthesizes the selected candidate data according to the synthesis instructions to generate ticker data with information on the display direction and display speed set, and displays the synthesized ticker data according to the set display direction and display speed.

In the conventional technology, however, the candidate ticker data need to be selected every time the ticker data is generated, which may increase the costs of producing the ticker such as the labor costs of the operator that selects the candidate ticker data.

It could therefore be helpful to provide an information processing apparatus, an information processing method, and an information processing program capable of reducing costs associated with ticker production.

SUMMARY

I thus provide:
(1) An information processing apparatus includes: a storage for storing a template that defines a display form of a ticker; a selection unit for selecting the template stored in the storage; a material data acquisition unit for acquiring a material data to be displayed on the ticker; a production unit for producing ticker data by applying the template selected by the selection unit to the material data acquired by the material data acquisition unit; and a provision unit for providing data including the ticker data produced by the production unit.
(2) The information processing apparatus may further include a UI provision unit for providing a user interface for selecting the template. The selection unit may select the template on the basis of a selection result in the user interface provided by the UI provision unit.
(3) The UI provision unit may provide a user interface for selecting a plurality of templates, and the production unit may produce a plurality of ticker data by applying the plurality of templates selected by the selection unit.
(4) The UI provision unit may further provide a user interface for setting up a template, and the production unit may produce ticker data on the basis of settings in the user interface provided by the UI provision unit.
(5) The UI provision unit may provide a user interface for checking a display form of the ticker in the set template.
(6) The UI provision unit may provide a user interface for checking a display form of the ticker in which a size of a display range of text is automatically adjusted according to a number of characters of the text data acquired by the material data acquisition unit.
(7) The UI provision unit may provide a user interface for checking a display form of the ticker in which a size of characters in a fixed display range is automatically adjusted according to a number of characters in the text data acquired by the material data acquisition unit.
(8) The information processing apparatus may further include: a communication controller that controls communication between the information processing apparatus and a terminal connected via a network; and an authentication unit that authenticates a user of the terminal using the communication controller. The selection unit may select a template according to the user authenticated by the authentication unit.
(9) A method of information processing executed by an information processing apparatus includes the steps of: storing a template that defines a display form of a ticker; selecting the template stored in the storing step; acquiring material data to be displayed on the ticker; producing ticker data by applying the template selected in the selecting step to the material data acquired in the material data acquiring step; and providing provision data including the ticker data produced in the producing step.
(10) An information processing program causes a computer to execute the functions of: storing a template that defines a display form of a ticker; selecting the template stored in the storing function; acquiring material data to be displayed on the ticker; producing ticker data by applying the template selected by the selecting function to the material data acquired by the material data acquiring function; and providing provision data including the ticker data produced by the producing function.

The costs of producing a ticker are reduced by storing a template that defines a display form of the ticker, selecting the stored template, obtaining material data to be displayed on the ticker, applying the selected template to the obtained material data to produce ticker data, and providing the data including the produced ticker data.

DESCRIPTION OF REFERENCE NUMERALS

1: Information Processing Apparatus
11: Communication Controller
12: Authentication Unit
13: Storage 14: Material Data Acquisition Unit
15: UI Provision Unit
16: Selection Unit
17: Production Unit
18: Provision Unit
2: User System
21: Terminal
210: Ticker Setting Unit
211: Material Data Acquisition Unit
212: Ticker Data Acquisition Unit
22: Transmission Device
23: Broadcasting Facility
3: User System
31: Terminal
310: Ticker Tape Setting Unit
311: Ticker Data Acquisition Unit
32: Display Device
4: Material Data Provision Device
5: Image Distribution System
9: Network
101: CPU
102: RAM
103: ROM
104: I/O Device
105: Communication I/F
1000: Template Selection Screen
1010: Sports
1011: Selection Screen
1020: News
1030: Election
1040: Earthquake and Tidal Wave Information
1050: Regional Information
1100: Template Setting Screen
1110: Display Range Adjustment
1111: Setting Screen
1112: Text Input Unit
1113: Sample Display Button
1114: Sample
1115: Sample
1120: Text Size Adjustment
1121: Setting Screen
1122: Text Input Unit
1123: Sample Display Button
1124: Sample
1125: Sample
1130: Ticker Display
1140: Switching Display

DETAILED DESCRIPTION

With reference to the drawings, an information processing apparatus, an information processing method, and an information processing program according to an example will be described in detail below.

Figure 1:
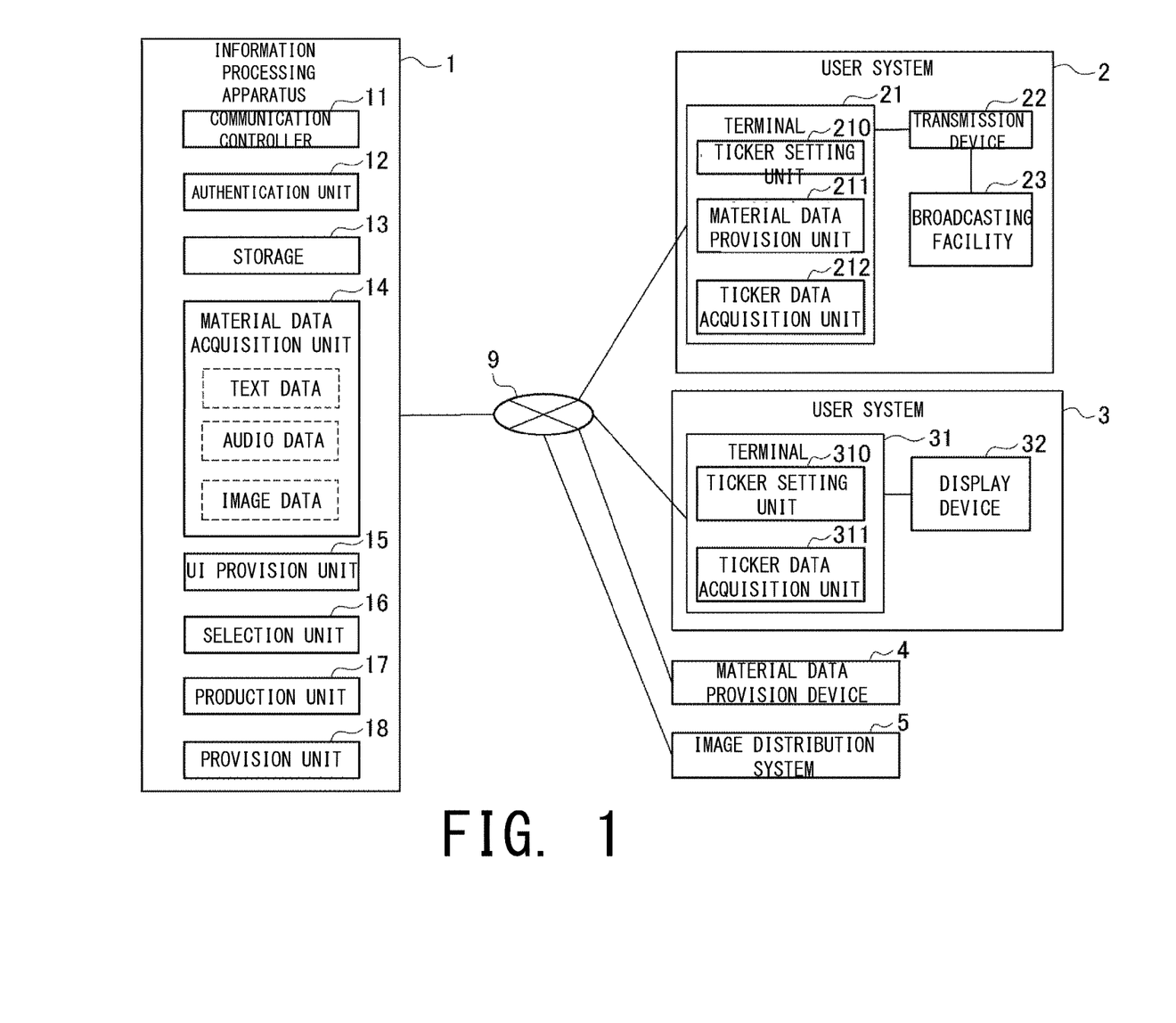
FIG. 1 is a block diagram illustrating an example of a software configuration of an information processing apparatus.

First, with reference to FIG. 1, functions of an information processing apparatus will be described. FIG. 1 is a block diagram illustrating an example of a software configuration of an information processing apparatus.

In FIG. 1, an information processing apparatus 1 is communicatively connected to a terminal 21, a terminal 31, a material data provision device 4, and an image distribution system 5 via a network 9. FIG. 1 illustrates an example of the connection points of the information processing unit 1 only, and thus the connection points are not limited thereto.

The information processing apparatus 1 has functional units of a communication controller 11, an authentication unit 12, a storage 13, a material data acquisition unit 14, a UI provision unit 15, a selection unit 16, a production unit 17, and a provision unit 18. The above functional units of the information processing apparatus 1 are described as being functional modules comprising the information processing program (software).

The communication controller 11 controls communication between the information processing apparatus 1 and each of a plurality of terminals 21, 31, material data provision device 4 or image distribution system 5 (hereinafter all or some of the terminals 21, 31, material data provision device 4, and image distribution system 5 may be referred to as the "terminal 21 and others") connected via a network.

The authentication unit 12 authenticates a user of the terminal 21 using the communication controller 11. For example, a user of the terminal 21 is directed to a person that has the authority to use the functions provided by the information processing apparatus 1, which is communicatively connected from the terminal 21. The authentication unit 12 authenticates a user with user privileges, for example, by a login ID and password assigned to each user. The user in this example need not be an identified individual. For example, if a single login ID is used sequentially by multiple people, the user may be the one currently using the user ID. The authentication unit 12 may use any authentication method (e.g., biometric authentication, and magnetic card authentication) other than the authentication using the login ID and password.

"Ticker," "ticker data," "material data," "ticker display form," and "template" will be described below.

A ticker is directed to information such as text information, symbol information, graphic information, audio information or image information, or combination thereof (hereinafter, referred to as "text information and others," for example) that are superimposed, inserted, or combined (hereinafter, referred to as "superimposition and others," for example) with an original image such as a moving image and a still image. The original image is directed to, for example, a television image used for television broadcasting, a video used for a video distribution service, and a display image displayed on a large display device, for example. The data used for a ticker superimposed on the original image, for example, is referred to as ticker data. The ticker data is produced on the basis of the material data described below and provided to a user system owned by the user (described below). The ticker data is superimposed on all or part of the original image in the user system to be broadcast, distributed or displayed, for example. The ticker data may be, for example, image data including ticker data. A ticker may also be referred to as a caption, subtitle, ticker, alert, or superimpose, for example, depending on the region, contents, or format in which it is used, and shall be included in the ticker.

The material data is directed to data of a material used for the ticker such as text data including text information, audio data including audio information, graphic data represented by vector data, for example, or image data including image information, or a combination thereof. Since the graphic information is rasterized to be an image, the image data may include the graphic information.

The text data may include, for example, time information, weather information, traffic information, breaking news or subtitles, for example. The text data may include input data manually entered through a keyboard (not shown) of the terminal 21. The text data is displayed, for example, in television broadcasts, videos used for video distribution services, or display images displayed on a large display device.

The audio data may include, for example, speech or text information generated by speech recognition. The audio data is used, for example, in the secondary audio of the television broadcast or converted to the text data to be displayed on the television broadcast, for example.

The image data may include still image information and moving image information (including animation of multiple still images). The image data is displayed as thumbnails, split screen, or full screen on the display screen of TV broadcasts, for example.

The material data may include information specific to the contents of the television broadcast program. For example, the material data may include sports-specific score stats, game stats or player introductions in sports programs, news items in news programs, contents posted on social networking services (SNS), or flash report of votes counted in election programs, for example.

The display form of the ticker may be a form of decoration, effect, or review that is set for the material data. The display form of the ticker may include settings such as the position of the ticker in the original image, font for the text information, emphasis, switching between 2 dimensional (2D) and 3D display, effects such as 3D motion (animation) or 3D rotation, addition of reading form of the Chinese characters, and display of multiple lines (hereinafter, referred to as "decorations and others"), for example. The display form of the ticker (i.e., decorations) may include a setting of output volume for audio information, or a setting of voice recognition, or a setting of a display position or display size on the screen for the image information. The display form of the ticker may include the order or time points of transmitting the produced ticker data. The display form of the ticker is set (defined) by a template described below.

The template is directed to configuration information (configuration data) that defines the display form of the ticker, and is prepared in advance as a configuration file, for example. The ticker data is created by applying the display form set in the template to the material data. For example, if a ticker that is specific to contents of a TV program is wished to be used, a ticker corresponding to the TV program may be prepared in advance to produce ticker data that is specific to the TV program.

Multiple types of templates may be prepared in advance. The ticker data is produced by selecting one or more templates from among the multiple types of templates. The template may be preset by a user, and the set template may be edited (modified) by a user.

The storage 13 stores one or more templates that define the display form of the ticker. The template may be stored in the storage 13 in advance as a readable configuration file, for example. The storage 13 stores the multiple types of templates. For example, when the ticker specific to the contents of the television program is produced as described above, a plurality of templates specific to the contents of the program are stored in the storage 13 so that a template allowing ticker data specific to the contents of the program to be produced may be easily selected from among the stored templates.

The material data acquisition unit 14 acquires the material data to be displayed on the ticker. FIG. 1 illustrates an example in which the material data acquisition unit 14 acquires text data, audio data, and image data. The material data acquisition unit 14 acquires material data from the inside of the information processing apparatus 1 (e.g., the storage 13) or the outside of the information processing apparatus 1. FIG. 1 illustrates an example in which the material data acquisition unit 14 acquires the material data from a material data provision unit 211 of the terminal 21 or the material data provision device 4. When referring to the "acquisition" of data, it may be a pull-type acquisition of data such as a download, or a push-type acquisition of data by which data sent from another device is received. For example, the material data acquisition unit 14 may provide a UI for entering or selecting the material data to be provided to the terminal 21, and a user of the terminal 21 may acquire the material data by operating the UI displayed on the terminal 21. The material data acquisition unit 14 may acquire the material data by reading the material data stored in the material data provision device 4.

Figure 2:
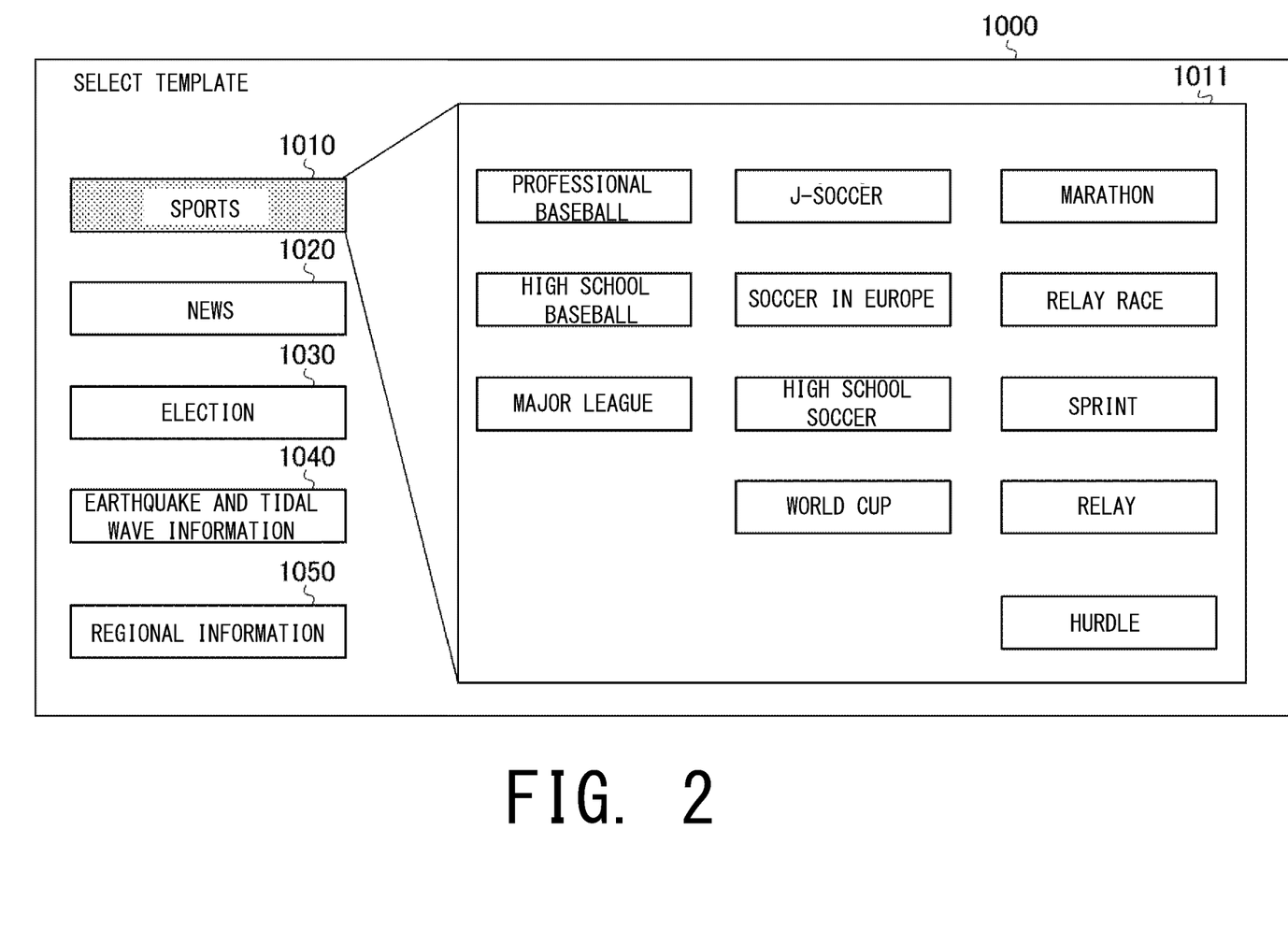
FIG. 2 is a diagram illustrating an example of a screen for selecting a template used in an information processing apparatus 1.
Figure 3:
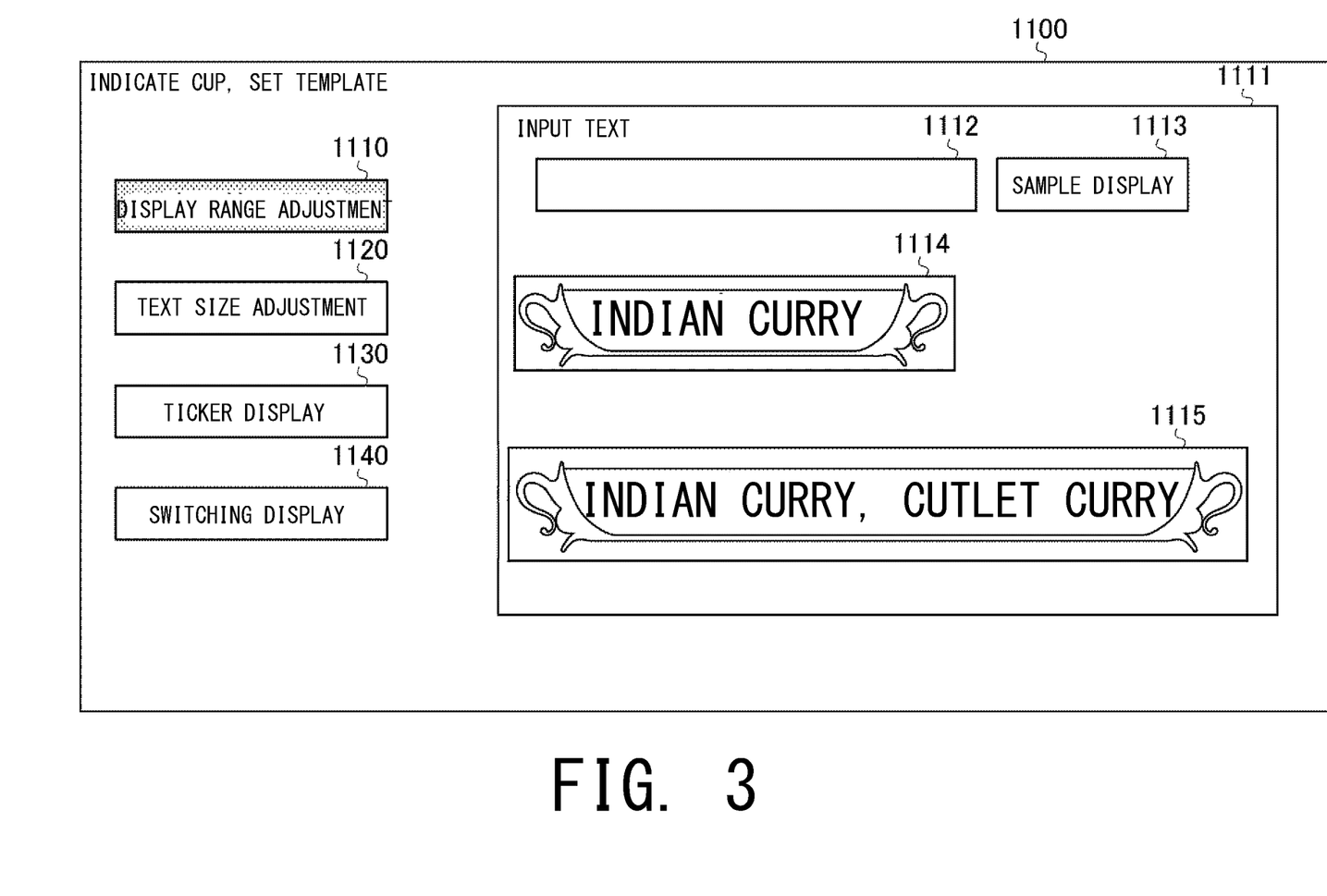
FIG. 3 is a diagram illustrating a first example of a template setting screen used in the information processing apparatus 1.
Figure 4:
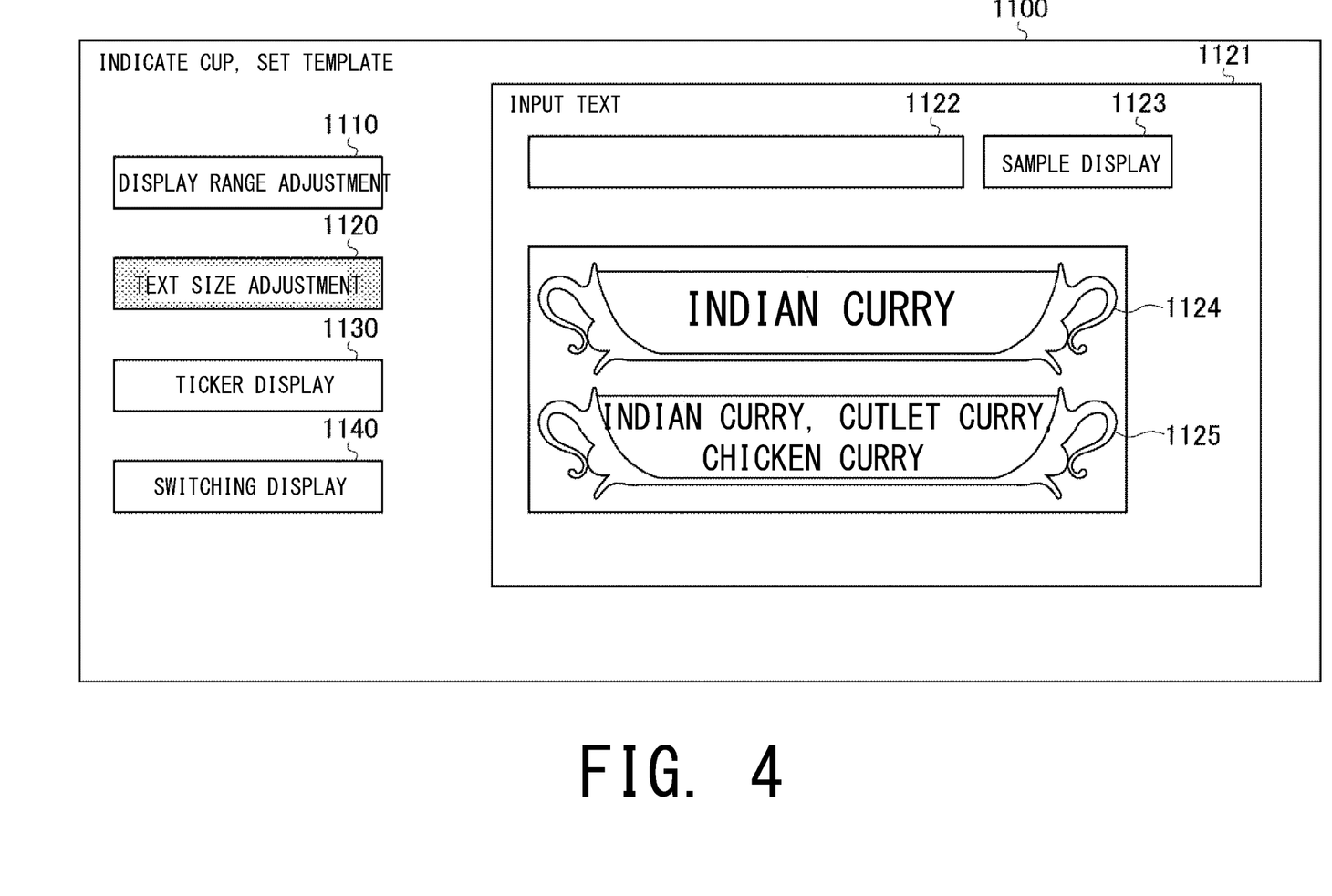
FIG. 4 is a diagram illustrating a second example of the template setting screen used in the information processing apparatus 1.

The UI provision unit 15 provides the terminal 21 and others with a user interface (UI). The UI provision unit 15 may provide a user interface for selecting the template. The UI provision unit 15 may also provide a user interface for setting up the template. The UI provided by the UI provision unit 15 is directed to, for example, a web screen displayed via a web browser of the terminal 21, for example. This allows the user to select or set a template by manipulating the web screen display (e.g., by a mouse click). With reference to FIGS. 2 to 4, the UI provided by the UI provision unit 15 will be described below.

UI for Selecting Template

FIG. 2 is a diagram illustrating an example of a screen for selecting the template used in the information processing apparatus 1.

The template selection screen 1000 has field selection buttons in the fields of sports 1010, news 1020, election 1030, earthquake and tidal wave information 1040 and regional information 1050. The template selection screen 1000 shown in FIG. 2 displays a selection screen 1011 when the field selection button of the sports 1010 is pressed. The selection screen 1011 has selection buttons for the sports such as professional baseball, J-soccer, or marathon, for example. This allows the user to select a template for each sport by pressing any one or more of the selection buttons. The template selection screen 1000 may be made to display a more detailed template selection screen when the selection button for each sport is pressed.

UI for Setting Up Templates

FIG. 3 is a diagram illustrating a first example of the template setting screen used in the information processing apparatus 1. The UI provision unit 15 provides a user interface for checking the display form of the ticker in which the size of the display range of the text is automatically adjusted on the basis of the template according to the number of characters in the text data acquired by the material data acquisition unit 14. That is, the template shown in FIG. 3 corresponds to a template that automatically adjusts the size of the display range of the text according to the number of characters in the text data.

The template setting screen 1100 has display form selection buttons including display range adjustment 1110, text size adjustment 1120, ticker display 1130, and switching display 1140. FIG. 3 shows the setting screen 1111 when the display mode selection button of the display range adjustment 1110 is pressed. The setting screen 1111 has a text input unit 1112, a sample display button 1113, a sample 1114, and a sample 1115. The samples 1114 and 1115 are display samples showing the display form of the ticker when a user inputs characters via a keyboard, for example, into the text input unit 1112.

The display range adjustment 1110 displays, as the sample 1114 or sample 1115, the display form of a ticker in which the text entered via the text input unit 1112 is acquired as the text data by the material data acquisition unit 14 and the size of the display range of the text is automatically adjusted according to the number of characters in the text data. For example, as the user enters the 12 characters of "Indian Curry" via the text input unit 1112 and then presses the sample display button 1113, the setting screen 1111 displays a sample 1114 of the ticker in which the horizontal display range of the figure of the container in which the characters are entered is automatically adjusted according to the 12 characters. In contrast, as the user enters the 26 characters of "Indian Curry, Cutlet Curry" via the text input unit 1112 and then presses the sample display button 1113, the setting screen 1111 displays a sample 1115 in which the horizontal display range of the figure of the container in which the characters are entered is automatically adjusted according to the 26 characters. The shape of the container in the sample 1114 and the shape of the container in the sample 1115 are automatically adjusted in shape according to the corresponding text data. This allows the use of a template that automatically adjusts the size of the display range according to the input text, reducing the costs of producing a ticker. In the above template, an upper limit of the number of characters may be set. If the upper limit of the number of characters is not set, the ticker may be displayed by a predetermined number of characters or more (described below).

Although the automatic adjustment of the size of the display range of the text on the setting screen 1111 when the range of the figure with the text is horizontally adjusted is shown, the automatic adjustment of the size of the display range is not limited thereto. For example, the display range may be automatically adjusted in size in the vertical, both vertical and horizontal directions, or in the other directions (e.g., diagonally).

FIG. 4 is a diagram illustrating a second example of the template setting screen used in the information processing apparatus 1. The UI provision unit 15 provides a user interface for checking the display form of the ticker in which the size of the characters in the fixed display range is automatically adjusted according to the number of characters in the text data acquired by the material data acquisition unit 14. That is, the template shown in FIG. 4 corresponds to a template that automatically adjusts the size of the characters in the fixed display range according to the number of characters in the text data.

FIG. 4 shows the setting screen 1121 at the time when the display form selection button of the text size adjustment 1120 is pressed. The setting screen 1121 has a character input unit 1122, a sample display button 1123, a sample 1124, and a sample 1125. The samples 1124 and 1125 are display samples showing the display form of the ticker at the time when the user inputs characters via a keyboard, for example, into the character input unit 1122.

The display range adjustment 1110 displays, as the sample 1124 or sample 1125, the display form of a ticker in which the text entered via the character input unit 1122 is acquired as the text data by the material data acquisition unit 14 and the size of the characters in the fixed display range is automatically adjusted according to the number of characters in the acquired text data. For example, as the user enters the 12 characters of "Indian Curry" via the character input unit 1122 and then presses the sample display button 1123, the setting screen 1121 displays the sample 1124 of the ticker with the size of the 12 characters automatically adjusted to a display range where the horizontal size of the figure of the container in which the characters are entered is fixed. In contrast, as the user enters 41 characters of "Indian Curry, Cutlet Curry, Chicken Curry" via the character input unit 1122 and then presses the sample display button 1123, the setting screen 1121 displays the sample 1125 of the ticker in which the size of the 41 characters is automatically adjusted to the display range where the horizontal size of the figure of the container in which the characters are entered is fixed. The shape of the container in the sample 1124 and the shape of the container in the sample 1125 are fixed, and the horizontal size of the text is automatically adjusted according to the corresponding text data. This allows the use of a template that automatically adjusts the size of the characters according to the input text, reducing the costs of producing a ticker.

Although the automatic adjustment of the size of the characters in the setting screen 1121 at the time when the horizontal size of the characters is adjusted is shown, the automatic adjustment of the size of the characters is not limited to this. For example, the size of the characters may be automatically adjusted in the vertical, both vertical and horizontal directions, or in the other directions (e.g., diagonally).

The ticker display 1130 is directed to a display form selection button for setting a display form in which the text is allowed to move and stream in a predetermined display range to be displayed. In the setting of the ticker display, for example, the speed at which the text streams, and the font of the text may be set, for example.

The switching display 1140 is directed to a display form selection button for setting a display form in which the text is displayed while the display of the text is switched. In the setting of the switching display, for example, the time for switching the display, and the font of the text may be set. The illustrated setting screen is an example of the setting screen and does not limit the setting method.

The specification is returned to the description of FIG. 1 again. The selection unit 16 selects a template stored in the storage 13. Selecting a template may include, in addition to selecting one or more templates from a plurality of templates, determining the meaning of the material data in the ticker (described below). The specific method of selecting a template on the basis of the contents of the material data will be described below.

Selecting a Template on the Basis of the Selection Results in the User Interface The selection unit 16 selects a template on the basis of the selection result in the user interface provided by the UI provision unit 15. For example, when the selection button for "Professional Baseball" is pressed in the selection screen 1011 in FIG. 2, the selection unit 16 selects a pre-stored template according to the pressing of the selection button for professional baseball (selection result).

The selection unit 16 may select a plurality of templates on the basis of the selection result in the user interface provided by the UI provision unit 15. For example, when a user wishes to check a display form of a ticker on the basis of the template, selecting multiple templates allows the user to check the display forms of them at once.

Selecting Templates on the Basis of Authenticated Users

The selection unit 16 may select a template according to the user authenticated by the authentication unit 12. The communication controller 11 controls communication between the information processing apparatus 1 and the terminal 21 and other devices connected via the network 9, and the authentication unit 12 uses the communication controller 11 to authenticate the user of the terminal 21 and other devices. For example, the storage 13 stores a template selected or set by the user. The selection unit 16 selects a template according to the authenticated user to allow the selection unit 16 to automatically select a template that has already been selected or set up without having to select or set up the template again, thereby saving time and efforts in selecting the template, for example, and reducing the costs associated with production of the ticker.

Selecting a Template on the Basis of the Provider of the Material Data

The selection unit 16 may select a template on the basis of the provider of the material data. The provider of the material data is directed to a person that has provided the material data and information that is associated with the material data on a one-to-one basis. The provider of the material data may be identified by, for example, information identifying a person such as a user authenticated by the authentication unit 12, information identifying a device such as a terminal 21, or information on access to the material data such as a storage area of the material data in the material data provision device 4. Storage of the association information in which the provider of the material data is associated with the template allows the selection unit 16 to select one or more templates on the basis of the provider of the material data, thereby reducing the costs associated with production of the ticker.

For example, a ticker in a particular display form may be used in a particular television program. When the provider of the material data is directed to a person that produces a ticker in the TV program, the selection unit 16 selects a template corresponding to the provider, thereby reducing the man-hours needed to select the template in production of the ticker.

The production unit 17 produces the ticker data by applying the template selected by the selection unit 16 to the material data acquired by the material data acquisition unit 14. Applying the template to the material data is directed to applying the display form set in the template to the material data. The display form set in the template may include decorations for the material data, for example. For example, the production unit 17 produces ticker data for allowing text data to stream in a predetermined area of the display screen to be displayed. The production unit 17 may also produce ticker data displayed in a three-dimensional display. In addition, the production unit 17 may convert the audio data included in the video file obtained as material data to text data to produce ticker data in which the text data converted to video is superimposed as captions.

The production unit 17 may produce image data that is obtained by image transforming (rasterizing, for example) the ticker data to which the template is applied. That is, in this example, the ticker data produced by the production unit 17 may be data before it is converted to image data or after it is converted to an image.

When the selection unit 16 selects more than one templates, the production unit 17 produces the ticker data to which each template is applied. For example, if the selected templates set different display forms, the production unit 17 produces the material data as ticker data in each of the display forms.

The provision unit 18 provides the provision data including the ticker data produced by the production unit 17. The provision unit 18 provides the provision data to, for example, the terminal 21, the terminal 31 or the image distribution system 5 connected via the network 9. The provision data provided by the provision unit 18 may be, for example, communication data encoded according to a communication protocol via the network 9, or cryptographic data encrypted in a predetermined encryption scheme.

The provision unit 18 may provide the ticker data in a data format corresponding to the input of a transmission device 22 to a ticker data acquisition unit 212 of the terminal 21. For example, the provision unit 18 may provide a signal that complies with the video electrical standard of a serial digital interface (SDI), or data including the signal. The provision unit 18 may transmit the ticker data in accordance with the transmission time point of the transmission device 22. The provision unit 18 may also transmit the ticker data in response to a request from a user system 2.

The user system 2 is an example of a system that transmits a ticker from the transmission device 22 to the broadcasting facility 23, which system provides the material data to the information processing apparatus 1 and obtains the ticker data from the information processing apparatus 1. The user system 2 includes the terminal 21, the transmission device 22, and the broadcasting facility 23. The terminal 21 includes a ticker setting unit 210, the material data provision unit 211, and the ticker data acquisition unit 212.

The ticker setting unit 210 is a web browser, for example, that displays a user interface for selecting a template provided by the UI provision unit 15, allowing the user to select the template. The ticker setting unit 210 may also display a user interface for setting a template to allow the user to set the template.

The material data provision unit 211 provides the material data to the information processing apparatus 1. The material data provision unit 211 may provide the material data by the user (operator) of the terminal 21 operating the UI provided by the material data acquisition unit 14. For example, in the UI provided by the material data acquisition unit 14, the user selects a file containing the material data or enters the text data through a keyboard to obtain the material data.

The ticker data acquisition unit 212 acquires the ticker data produced by the information processing apparatus 1 and supplies it to the transmission device 22. For example, the ticker data acquisition unit 212 may acquire the ticker data by obtaining a signal from the provision unit 18 indicating that the ticker data is now available. When a plurality of ticker data is produced, the ticker data acquisition unit 212 acquires the plurality of produced ticker data. The ticker data acquisition unit 212 may display a plurality of acquired ticker data selectable to a user and output the selected ticker data to the transmission device 22.

The transmission device 22 is directed to a device that transmits a ticker image to the broadcasting facility 23, and may include, an image input unit for entering the ticker data, a frame buffer for temporarily storing the ticker data, and an image output unit for outputting the ticker data stored in the frame buffer as a frame image (ticker image) in a predetermined image form, which are not shown. The transmission device 22 outputs the ticker image temporarily stored in the frame buffer to the broadcasting facility 23 according to the instructions from a device (not shown) for controlling the transmission time point.

The broadcasting facility 23 is installed in a television broadcasting station and generates an image including a ticker used for television broadcasting by superimposing the ticker image transmitted from the transmission device 22 on the original image, for example.

Providing the material data allows the user system 2 to acquire the ticker data on the basis of the contents of the material data, thus reducing the production costs for producing the ticker data.

The user system 3 is an example of a system that displays an image on a display device 32 and obtains ticker data from the information processing apparatus 1. The user system 3 includes the terminal 31 and the display device 32. The terminal 31 includes a ticker setting unit 310 and a ticker data acquisition unit 311.

The ticker setting unit 310 is a web browser, for example, that displays a user interface for selecting a template provided by the UI provision unit 15, allowing the user to select the template. The ticker setting unit 310 may also display a user interface for setting a template to allow the user to set the template.

The ticker data acquisition unit 311 acquires the ticker data produced by the information processing apparatus 1 and outputs the ticker data as display data that can be displayed on the display device 32. For example, the ticker data acquisition unit 311 may acquire the ticker data by obtaining a signal from the provision unit 18 indicating that the ticker data is now available, in the same manner as in the ticker data acquisition unit 212. When a plurality of ticker data is produced, the ticker data acquisition unit 311 may acquire the plurality of produced ticker data, display the acquired plurality of ticker data selectable to the user, and then output the selected ticker data to the display device 32. The ticker data acquisition unit 311 may convert the acquired ticker data into display data (e.g., a video signal) that can be displayed on the display device 32, and output the data to the display device 32.

The display device 32 is directed to a device that displays the display data supplied from the ticker data acquisition unit 311. The display device 32 is, for example, a large display installed in a public place, or digital signage installed in a commercial facility, for example.

The user system 3 is capable of acquiring the ticker data on the basis of the contents of the material data, reducing the production costs for producing the ticker data.

The material data provision device 4 exemplifies a device that provides material data to the information processing apparatus 1. The material data provision device 4 is directed to, for example, a network storage service that stores material data in a readable form. The material data provision device 4 may provide the material data, for example, by enabling the material data stored using a predetermined network address and password to be readable. Since the information processing apparatus 1 is capable of producing the ticker data on the basis of the contents of the material data provided by the material data provision device 4, reducing the production costs for producing the ticker data.

The image distribution system 5 is directed to a system for distributing an image (a moving image or still image) on the basis of the ticker data provided by the provision unit 18 to a destination (not shown) in real time or on demand. The image distribution system 5 may be a video distribution system that distributes videos. The image distribution system 5 may distribute the ticker data itself, or an image on which the ticker data is superimposed.

The network 9 is directed to, for example, the Internet. The network 9 may include, for example, a cell phone base station and a wireless LAN access point.

The communication controller 11, the authentication unit 12, the storage 13, the material data acquisition unit 14, the UI provision unit 15, the selection unit 16, the production unit 17, and the provision unit 18, each of which is possessed by the information processing unit 1, are an example of functional units of the information processing apparatus 1, and do not limit the functions of the information processing apparatus 1. For example, the information processing apparatus 1 need not have all of the above functional units and may have some of the functional units. The information processing apparatus 1 may also have functions other than those described above. For example, the information processing apparatus 1 may have an input function for entering information and an output function for reporting the operational status of the apparatus with an LED lamp, for example.

The functional units of the information processing apparatus 1 above are described as being software. However, at least one or more of the above functional units of the information processing apparatus 1 may be by hardware.

Any of the above functional units of the information processing apparatus 1 may be implemented by dividing one functional unit into a plurality of functional units. Any two or more of the above mentioned functional units of the information processing apparatus 1 may be consolidated into one functional unit. That is, FIG. 1 represents the functions of the information processing apparatus 1 in functional blocks, and does not indicate, for example, that each functional unit is composed of a separate program file.

The information processing apparatus 1 may be an apparatus comprising a single housing, or a system comprising a plurality of devices connected via a network, for example. For example, the information processing apparatus 1 may comprise some or all of its functions by other virtual devices such as a cloud service provided by a cloud computing system. That is, the information processing apparatus 1 may comprise at least one or more of the above functional units in the other devices. The information processing apparatus 1 may be a general purpose computer such as a desktop PC, or a dedicated device with limited functionality.

Figure 5:
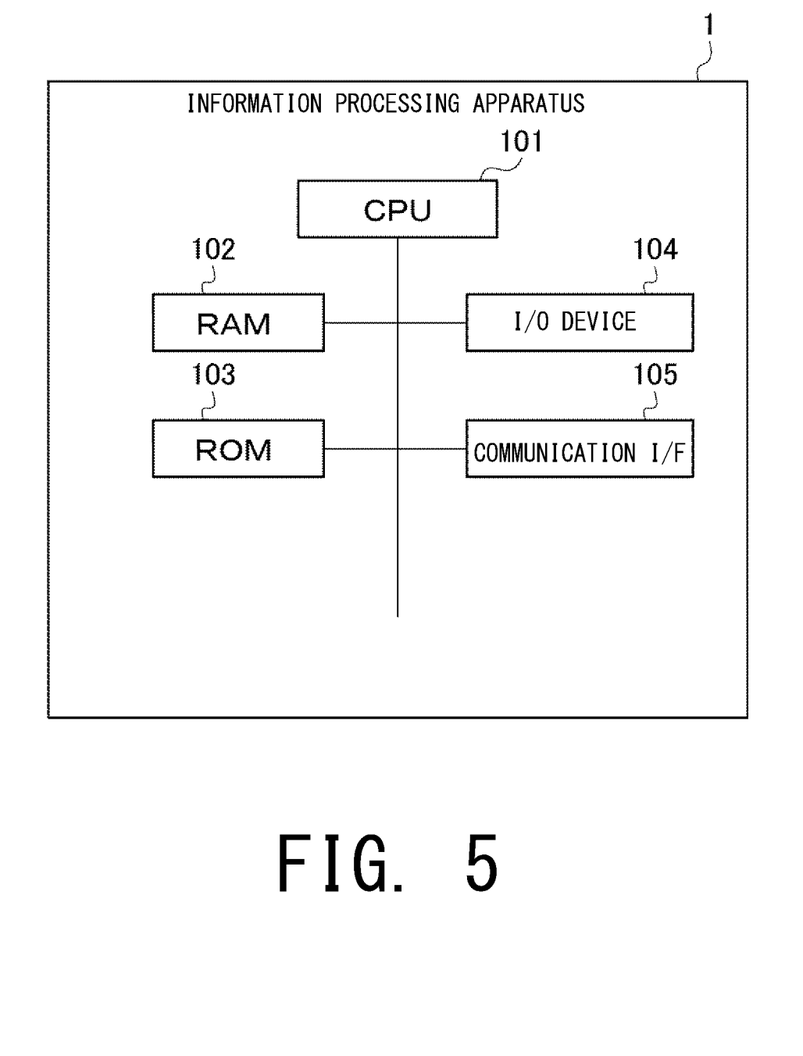
FIG. 5 is a block diagram illustrating an example of a hardware configuration of an information processing apparatus.

Next, with reference to FIG. 5, a hardware configuration of the information processing apparatus 1 will be described. FIG. 5 is a block diagram illustrating an example of the hardware configuration of the information processing apparatus 1.

The information processing apparatus 1 includes a central processing unit (CPU) 101, a random access memory (RAM) 102, a read-only memory (ROM) 103, an I/O device 104, and a communication interface (I/F) 105. The information processing apparatus 1 is directed to an apparatus that executes the information processing program described with reference to FIG. 1.

The CPU 101 controls the user terminal by executing the information processing program stored in the RAM 102 or ROM 103. The information processing program is obtained, for example, from a recording medium in which the program is stored or from a program distribution server via a network, installed in the ROM 103, and read and executed by the CPU 101.

The I/O device 104 has an operation input function and a display function (operation display function). The I/O device 104 is, for example, a touch panel. The touch panel enables the user of the information processing apparatus 1 to operate and input data using a finger tip or a touch pen, for example. Although the I/O device 104 is described in using a touch panel having an operation display function, the I/O device 104 may have a display device having a display function and an operation input device having an operation input function separately. In this example, the display screen of the touch panel may be implemented as the display screen of the display device and the operation of the touch panel may be implemented as the operation of the operation input device. The I/O device 104 may be in various forms such as a head-mounted display, eyeglass display, and wristwatch display, for example.

The communication I/F 105 is directed to a communication I/F. The communication I/F 105 performs near field wireless communication such as wireless LAN, wired LAN, and infrared, for example. Although FIG. 5 illustrates only a communication I/F 105 as a communication I/F, the information processing apparatus 1 may have an I/F for each communication in a plurality of communication methods.

Figure 6:
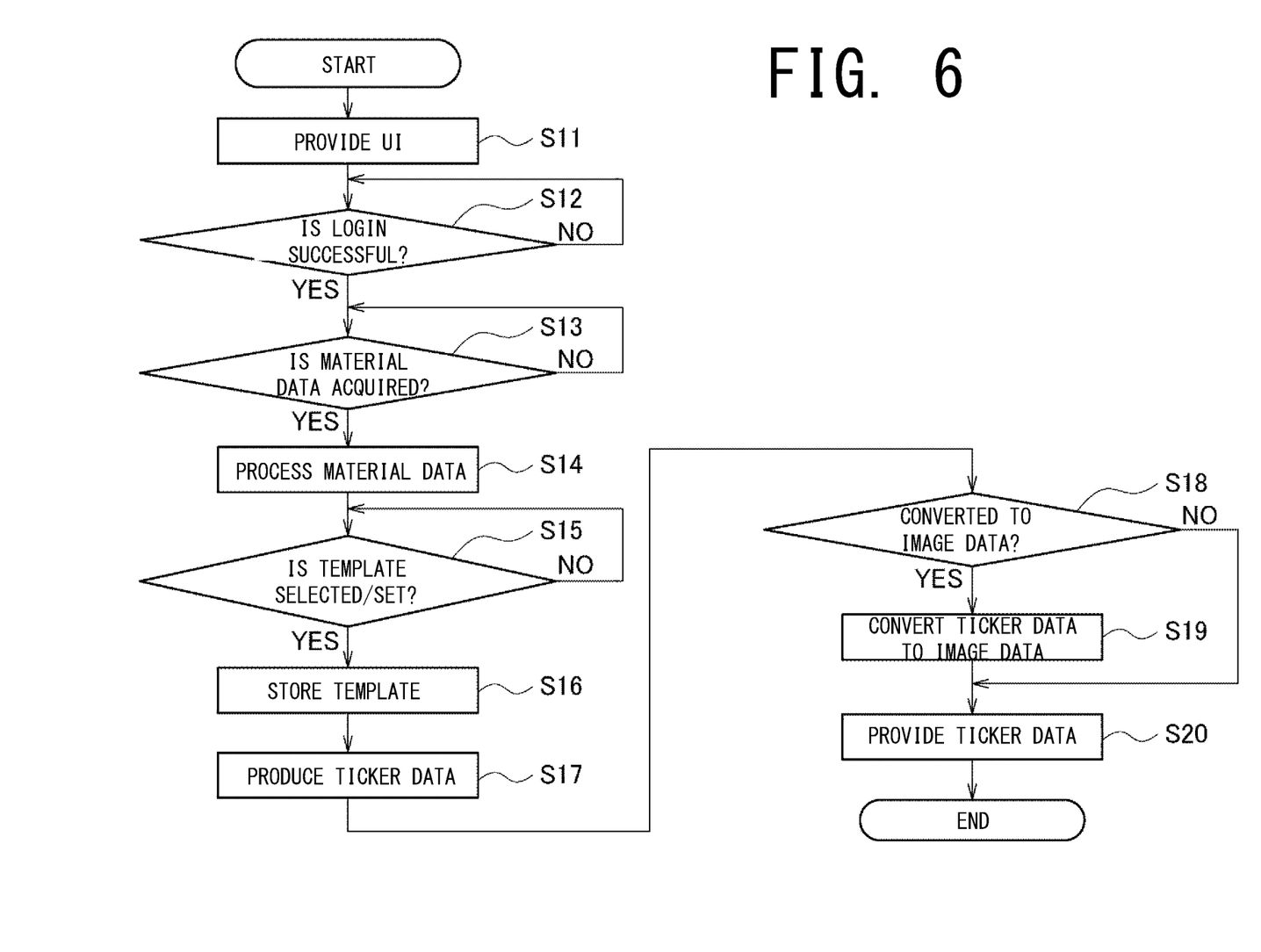
FIG. 6 is a flowchart illustrating an example of operations of the information processing apparatus 1.

Next, with reference to FIG. 6, operations of the information processing apparatus 1 will be described. FIG. 6 is a flowchart illustrating an example of operations of the information processing apparatus 1. Although the subject of execution of the operations in the flowchart shown below is described as being the information processing apparatus 1, each operation may be performed by each functional unit of the information processing apparatus 1 described above.

In FIG. 6, the information processing apparatus 1 provides a login screen for the user to log in, and further, provides a UI for the user to select a template or to set a template (step S11). The UI may be provided, for example, by providing a web site to a terminal 21 that accesses a predetermined network address of the information processing apparatus 1.

After executing the process in step S11, the information processing apparatus 1 determines whether the user of the terminal 21 has successfully logged in (step S12). Whether the login is successful may be determined by whether the authentication by the authentication unit 12 is successful. If it is determined that the login has not been successful (step S12: NO), the information processing apparatus 1 repeats the process in step S12 and waits for the login to be successful.

In contrast, if it is determined that the login has been successful (step S12: YES), the information processing apparatus 1 determines whether the material data has been acquired (step S13). Whether the material data has been acquired may be determined, for example, by whether the material data acquisition unit 14 has acquired the material data. If it is determined that the material data has not been acquired (step S13: NO), the information processing apparatus 1 repeats the process in step S13 and waits for the material data to be acquired.

In contrast, if it is determined that the material data has been acquired (step S13: YES), the information processing apparatus 1 processes the material data (step S14). The material data is processed, for example, where the material data acquired by the material data acquisition unit 14 is stored in the storage 13.

After executing the process in step S14, the information processing apparatus 1 checks whether a template has been selected or a template has been set (step S15). Whether a template has been selected or a template has been set may be checked, for example, by whether or not the result of the selection or setting of the template has been obtained from the terminal 21 using the UI provided in step S11. If it is determined that the template has not been selected or set (step S15: NO), the information processing apparatus 1 repeats the process in step S15 and waits for the template to be selected or set.

In contrast, if it is determined that the template has been selected or set (step S15: YES), the information processing apparatus 1 stores the selected or set template (step S16). The template may be stored for each logged-in user.

After executing the process in step S16, the information processing apparatus 1 produces the ticker data (step S17). The ticker data may be produced, for example, by the production unit 17 applying a template selected by the selection unit 16 to the material data acquired by the material data acquisition unit 14.

For example, if the material data is text data, the production unit 17 produces ticker data to allow the text data to stream in a predetermined area of the display screen set in the template to be displayed. The production unit 17 may also produce ticker data in which the text data is displayed in a three-dimensional form set in the template. When the material data is audio data, the production unit 17 may convert the audio data included in the video file obtained as the material data to text data on the basis of the template settings, and produce ticker data in which the text data converted to video is superimposed as captions in a predetermined area of the display screen. When the material data is image data, the production unit 17 may produce ticker data allowing the image data to be displayed in a predetermined area of the display screen set in the template.

If the template includes settings for the material data of a plurality of any of the text data, audio data, or image data, the production unit 17 produces ticker data in which each piece of the material data is applied to the template. For example, if the settings are made for the text data and image data in the template, and the material data includes the text data and image data, the production unit 17 creates ticker data in which the template is applied to each of the text data and image data.

After executing the process in step S17, the information processing apparatus 1 determines whether the ticker data is converted to image data (step S18). Whether the ticker data is converted to image data may be determined, for example, by the production unit 17 or the provision unit 18 determining depending on the destination of the ticker data. The recipient of the ticker data may, for example, obtain the ticker data along with the material data as supplementary information to the material data. When the production unit 17 or the provision unit 18 may determine, in the supplementary information of the material data, that the destination of the ticker data is the display device 32, for example, the production unit 17 or the provision unit 18 may determine that the ticker data is converted to the image data. If it is determined that ticker data is converted to the image data (step S18: YES), the information processing apparatus 1 converts the ticker data to the image data (step S19). The image data may be converted, for example, by the production unit 17 or the provision unit 18 converting the format of the ticker data to a data format in accordance with the display device displaying the ticker.

After executing the process in step S19 or if it is determined the ticker data is not converted to the image data (step S18: NO), the information processing apparatus 1 provides the ticker data (step S20). The ticker data may be provided by the provision unit 18 providing the ticker data (including ticker data after being converted to the image data) to the user system 2, the user system 3, or the image distribution system 5, for example. After executing the process in step S20, the information processing apparatus 1 terminates the operations shown in the flowchart.

The illustrated flowchart is an example of the operations of the information processing apparatus 1 and does not limit the operations in the information processing apparatus 1.

The various processes described above in this example may be performed by recording a program to execute the functions configuring the apparatus described in this example on a computer-readable recording medium and allowing the computer system to read and execute the program recorded on the recording medium. The "computer system" referred to herein may include hardware such as an OS and peripherals. The phrase "computer system" shall also include the environment in which the website is provided (or displayed) if the world wide web WWW system is used. A "computer-readable recording medium" is a storage device such as a writable non-volatile memory, which may include a flexible disk, a magneto-optical disk, a ROM, and a flash memory, a portable medium such as a CD-ROM, and a hard disk built into a computer system.

Moreover, a "computer-readable recording medium" may include a medium that holds a program for a certain amount of time such as a volatile memory (e.g., dynamic random access memory DRAM) in the computer system that serves as the server or client when the program is sent through a network such as the Internet or a communication line such as a telephone line. The program above may be transmitted from a computer system storing this program in a storage device, for example, to another computer system via a transmission medium or by transmission waves in the transmission medium. The "transmission medium" for transmitting a program refers to a medium having a function of transmitting information such as a network (communication network) such as the Internet or a communication channel (communication line) such as a telephone line. The program above may also be used to execute some of the aforementioned functions. Furthermore, the program may be a so-called differential file (differential program) that executes the aforementioned functions in combination with a program already stored in the computer system.

Although the examples have been described above with reference to the drawings, the specific configuration is not limited to the examples, and various modification may be made without departing from the spirit of this disclosure.

The invention claimed is:

1. An information processing apparatus comprising:
a processor configured to:
store a template that defines a display form of a ticker;
select the template stored in the storage; and
acquire a material data to be displayed on the ticker;
produce ticker data by applying the template selected by the information processing apparatus to the material data acquired by the information processing apparatus;
provide data including the ticker data produced by the information processing apparatus; and
provide a user interface for selecting a plurality of templates, wherein:
the information processing apparatus selects the template based on a selection result in the user interface provided by the information processing apparatus,
the information processing apparatus produces a plurality of ticker data by applying the plurality of templates selected by the information processing apparatus,
the information processing apparatus provides a user interface for setting up a template,
the information processing apparatus produces ticker data based on settings in the user interface provided by the information processing apparatus,
the information processing apparatus provides a user interface for checking a display form of the ticker in the set template, and
the information processing apparatus provides a user interface for checking a display form of the ticker in which a size of a display range of text is automatically adjusted according to a number of characters of the text data acquired by the information processing apparatus.

2. The information processing apparatus according to claim 1, further comprising:
a communication controller that controls communication between the information processing apparatus and a terminal connected via a network; and
an authenticator that authenticates a user of the terminal using the communication controller, wherein the information processing apparatus selects a template according to the user authenticated by the authenticator.

3. A method of information processing executed by an information processing apparatus, the method comprising the steps of:
storing a template that defines a display form of a ticker;
providing a user interface for selecting a plurality of templates, for setting up the templates, for checking a display form of the ticker in the set template, and for checking a display form of the ticker in the set template and in which a size of a display range of text is automatically adjusted according to a number of characters of the text data acquired by a material data acquisition unit;
selecting the template stored in the storing step;
acquiring material data to be displayed on the ticker;
producing a plurality of ticker data by applying the plurality of templates selected in the selecting step to the material data acquired in the material data acquiring step;
providing provision data including the ticker data produced in the producing step,
wherein the template is selected based on a selection result in the user interface and ticker data is produced based on settings in the user interface.

4. A non-transitory computer readable medium recording an information processing program that causes a computer to execute the functions of:
storing a template that defines a display form of a ticker;
selecting the template from a plurality of templates stored in the storing function;
acquiring material data to be displayed on the ticker;
producing a plurality ticker data by applying the plurality of templates selected by the selecting function to the material data acquired by the material data acquiring function;
providing provision data including the ticker data produced by the producing function;
providing a user interface for selecting the plurality of templates, setting up a template, for checking a display form of the ticker in the set template, and providing a user interface for checking a display form of the ticker in the set template and in which a size of a display range of text is automatically adjusted according to a number of characters of the text data acquired by a material data acquisition unit; and
producing ticker data based on settings in the user interface provided by a user interface (UI) provision unit.

5. An information processing apparatus comprising:
a processor configured to:
store a template that defines a display form of a ticker;
select the template stored in the storage; and
acquire a material data to be displayed on the ticker;
produce ticker data by applying the template selected by the information processing apparatus;
provide data including the ticker data produced by the information processing apparatus; and
provide a user interface for selecting a plurality of templates; wherein
the information processing apparatus selects the template based on a selection result in the user interface provided by the information processing apparatus,
the information processing apparatus produces a plurality of ticker data by applying the plurality of templates selected by the information processing apparatus,
the information processing apparatus provides a user interface for setting up a template, the information processing apparatus producer produces ticker data based on settings in the user interface provided by the information processing apparatus, the information processing apparatus provides a user interface for checking a display form of the ticker in the set template, and the information processing apparatus provides a user interface for checking a display form of the ticker in which a size of characters in a fixed display range is automatically adjusted according to a number of characters in the text data acquired by the information processing apparatus.

6. A method of information processing executed by an information processing apparatus, the method comprising the steps of:

storing a template that defines a display form of a ticker;

providing a user interface for selecting a plurality of templates, for setting up the templates, for checking a display form of the ticker in the set template, and for checking a display form of the ticker in the set template and in which a size of characters in a fixed display range is automatically adjusted according to a number of characters in the text data acquired by a material data acquisition unit;

selecting the template stored in the storing step;

acquiring material data to be displayed on the ticker;

producing a plurality of ticker data by applying the plurality of templates selected in the selecting step to the material data acquired in the material data acquiring step;

providing provision data including the ticker data produced in the producing step, wherein the template is selected based on a selection result in the user interface and ticker data is produced based on settings in the user interface.

7. A non-transitory computer readable medium recording an information processing program that causes a computer to execute the functions of:

storing a template that defines a display form of a ticker;

selecting the template from a plurality of templates stored in the storing function;

acquiring material data to be displayed on the ticker;

producing a plurality ticker data by applying the plurality of templates selected by the selecting function to the material data acquired by the material data acquiring function; and providing provision data including the ticker data produced by the producing function;

providing a user interface for selecting the plurality of templates, setting up a template, for checking a display form of the ticker in the set template, and providing a user interface for checking a display form of the ticker in the set template and in which a size of characters in a fixed display range is automatically adjusted according to a number of characters in the text data acquired by a material data acquisition unit; and producing ticker data based on settings in the user interface provided by a user interface (UI) provision unit, wherein the template is selected based on a selection result in the user interface.

* * * * *